June 20, 1944.  J. H. BLANKENBUEHLER  2,351,910
ARC VOLTAGE OR ARC LENGTH INDICATOR
Filed May 31, 1940  4 Sheets-Sheet 1

WITNESSES:
C. J. Weller.
F. V. Giolma

INVENTOR
John H. Blankenbuehler.
BY
ATTORNEY

June 20, 1944. J. H. BLANKENBUEHLER 2,351,910
ARC VOLTAGE OR ARC LENGTH INDICATOR
Filed May 31, 1940 4 Sheets-Sheet 2

WITNESSES:
C. J. Weller.
F. V. Giolma

INVENTOR
John H. Blankenbuehler.
BY
Crawford
ATTORNEY

WITNESSES:

INVENTOR
John H. Blankenbuehler.
ATTORNEY

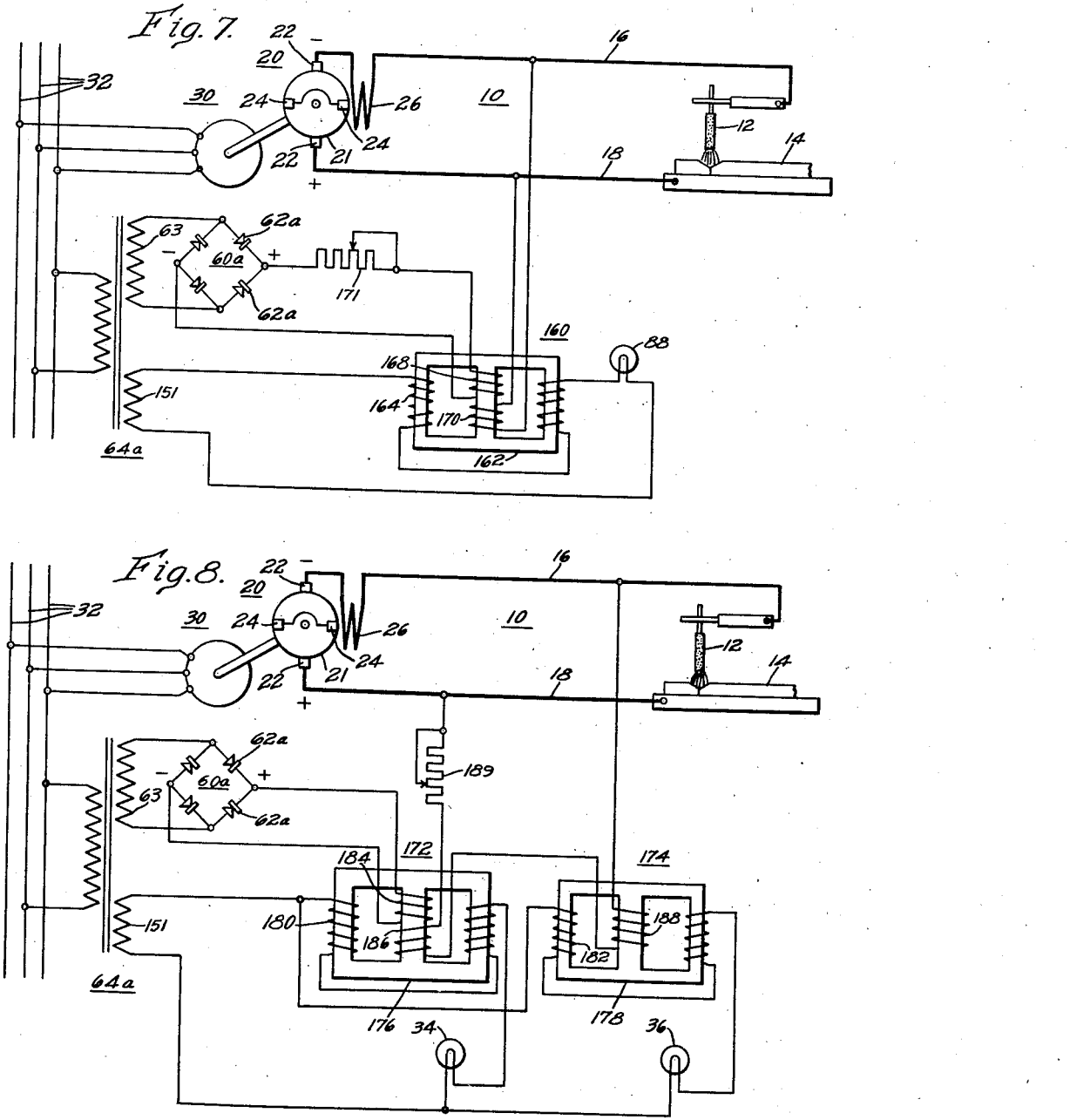

Patented June 20, 1944

2,351,910

UNITED STATES PATENT OFFICE 2,351,910

ARC VOLTAGE OR ARC LENGTH INDICATOR

John H. Blankenbuehler, Edgewood, Pa., assignor to Westinghouse Electric & Manufacturing Company, East Pittsburgh, Pa., a corporation of Pennsylvania Application May 31, 1940, Serial No. 338,103

5 Claims. (Cl. 177—311)

My invention relates, generally, to electric arc welding, and it has reference in particular to arc voltage or arc length indicators for arc welding circuits.

Generally stated, it is an object of my invention to provide indicating means, which is of simple construction and inexpensive to manufacture, for indicating the length or voltage of an arc in an arc welding circuit.

More specifically it is an object of my invention to provide for operating an indicator by electromagnetic means responsive to conditions of an arc welding circuit so as to indicate any deviation in the arc length or voltage from a predetermined normal value.

Another object of the invention is to provide for controlling indicating means in response to the conditions of an arc welding circuit so as to indicate when the length or voltage of the arc is greater than, equal to, or less than the desired value.

A further object of the invention is to provide for controlling indicating means in accordance with the differential between a predetermined control voltage and a voltage derived from an arc welding circuit so as to indicate the relative value of the voltage of the arc in the arc welding circuit with respect to a predetermined fixed normal arc voltage.

Other objects will, in part, be obvious and will, in part, be explained hereinafter.

In practicing my invention, a simple and effective arc voltage or arc length indicator may be provided for assisting an operator to maintain an arc having a predetermined normal length or voltage, which gives the best results under the existing conditions, as determined by the type of welding rod used, the amount of penetration desired, and other such factors. A suitable indicating device, such as a pair of lamps, may be positioned within the operator's field of view to provide an indication of the arc length. Since the voltage of the arc is proportional to its length, the energization of the lamps may be controlled by electromagnetic control means responsive to voltages derived from a source of substantially constant voltage of a predetermined value and from the welding circuit, to indicate to the operator any deviation from either a predetermined arc length or voltage.

For a more complete understanding of the nature and scope of my invention, reference may be had to the following detailed description, together with the accompanying drawings, in which:

Figs. 6, 7 and 8 illustrate yet further modifications embodying the principal features of the invention.

Figure 1:
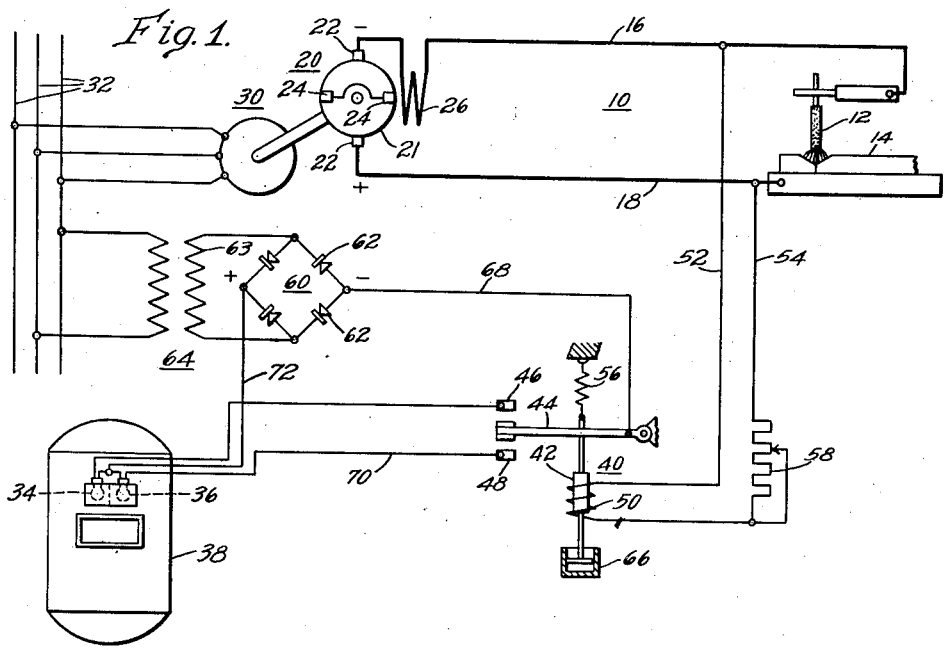
Figure 1 is a diagrammatic view of a welding system embodying the principal features of my invention.

Referring to Fig. 1, the reference numeral 10 may denote, generally, an arc welding circuit including a fusible electrode 12 and work 14 upon which a welding operation is to be performed. The welding circuit 10 may be connected to any suitable source of welding energy, being, for example, connected by means of the conductors 16 and 18 to the terminals of a generator 20.

The generator 20 may be of any type well known in the art, and may be of the cross-field type, as shown, provided with an armature 21 having main brushes 22, auxiliary close-circuited brushes 24, and a series field winding 26 associated therewith. The generator may be driven in any suitable manner, such as by means of a motor 30 which may be connected to a suitable source of energy by the conductors 32.

For the purpose of indicating to the welding operator whether the length of the arc, or the arc voltage of the welding circuit 10 is of a predetermined desired value or whether it is greater or less than the predetermined value, suitable indicating means may be provided, such as, for example, the lamps 34 and 36. The lamps 34 and 36 may be positioned within the field of view of the operator, being, for example, mounted in any suitable manner within the welding shield or helmet 38, so that the operator may observe them without any interruption of the welding operation.

Inasmuch as the voltage of the arc is directly proportional to its length under given conditions, the relative value of either of these characteristics may be measured by the value of the other, and hereinafter where reference is made to arc voltage alone, it is to be understood that arc length may be considered synonymous therewith. Thus suitable control means responsive to arc voltage conditions may be provided for selectively controlling the energization of the lamps 34 and 36 in order to indicate to the operator the relative value of the arc voltage. For example, electromagnetic means may be provided, such as the control relay 40, which may have an armature 42 operatively connected to a contact arm 44 for actuating the contact arm to engage either of a pair of stationary contact members 46 and 48. The control relay 40 may be provided with an operating winding 50 which may be connected to the welding circuit 10 by means of conductors 52 and 54 for actuating the armature 42. Suitable means, such as the spring 56, may be operatively connected to the armature to bias it against the force of the operating winding 50. Means may also be provided for adjusting the relay 40 to maintain the contact arm 44 in a balanced position between the stationary contacts 46 and 48 for different predetermined values of arc voltage in the welding circuit 10. For example, an adjustable resistor 58 may be connected in series circuit relation with the operating winding 50 for adjusting the voltage applied thereto, or provision may be made for adjusting the tension of spring 56.

By connecting the stationary contact members 46 and 48 of the control relay 40 between a suitable source of energy such as the rectifier bridge circuit 60 of rectifier devices 62, which may be connected to the secondary winding 63 of a suitable control transformer 64, and the lamps 34 and 36, respectively, the energization of the lamps 34 and 36 may be controlled in response to variations in the voltage of the arc in the welding circuit 10. In order to damp the movement of the contact arm 44, and prevent the energization of the indicating lamps 34 and 36 upon momentary fluctuations in the voltage of the arc, suitable retarding means, such as a dashpot 66 may be operatively connected to the armature 42 to retard the movement thereof.

By adjusting the resistor 58, the pull exerted by the operating winding 50 on the armature 42 may be balanced against the pull of the spring 56 so as to balance the contact arm 44 in the open position, intermediate the stationary contact members 46 and 48, when the voltage of the arc in the welding circuit is of a predetermined desired or normal value. Under these conditions the energizing circuits of both of the indicating lamps 34 and 36 are open and the lamps are dark.

If the voltage of the arc becomes greater than the predetermined value, the pull exerted by the operating winding 50 on the armature 42 of the control relay 40 increases, so that it becomes sufficient to overcome the pull of the spring 56. The contact arm 44 is actuated into engagement with the lower stationary contact member 48. An energizing circuit for the indicating lamp 36 is thus established from the rectifier bridge circuit 60 through the conductor 68, contact arm 44, stationary contact member 48, conductor 70, lamp 36, and conductor 72 back to the rectifier bridge circuit 60. The lamp 36 lights, indicating to the operator that the arc voltage is greater than the predetermined desired value.

Should the voltage of the arc become less than the predetermined desired or normal value, the pull exerted by the operating winding 50 on the armature 42 of the control relay 40 decreases so that the pull of the spring 56 becomes sufficient to actuate the contact arm 44 into engagement with the upper stationary contact member 46. An energizing circuit for the indicating lamp 34 is thus completed so that the lamp lights, warning the operator that the voltage of the arc is less than the predetermined value.

Figure 2:
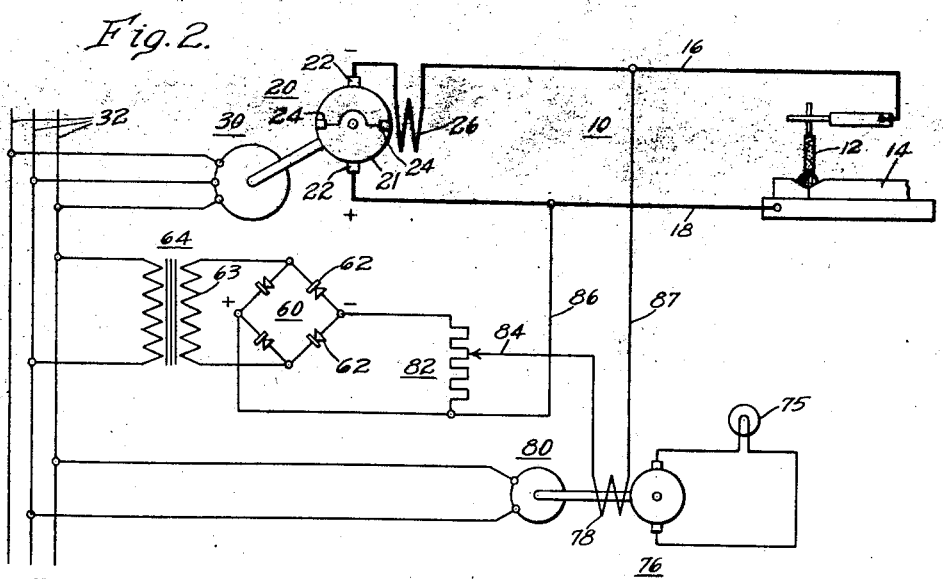
Fig. 2 illustrates a modification of the invention.

In the modification of the invention shown in Fig. 2, the welding circuit 10 may be connected to the terminals of the generator 20 in a similar manner to that shown in Fig. 1. In order to indicate variations in the voltage of the arc from a predetermined value, a single indicating lamp 75 may be utilized. The indicating lamp 75 may be connected to the terminals of a suitable source of variable voltage, such as a control generator 76, which may be provided with a separately excited field winding 78 and a driving motor 80.

With a view to controlling the energization of the indicating lamp 75 in accordance with variations in the voltage of the arc from a predetermined value, the field winding 78 of the control generator may be connected in bridged relation to the welding circuit 10 and a suitable source of substantially constant control voltage of a predetermined value. A control potentiometer 82 having an adjustable contact 84 may be connected to a rectifier bridge circuit 60, which is connected to the secondary winding 63 of a suitable control transformer 64, for supplying a substantially constant direct current control voltage of a predetermined value for this purpose.

By connecting the control potentiometer 82 and the welding circuit in opposed relation by means of the conductor 86, and connecting the field winding 78 of the control generator 76 in bridged circuit relation therewith, the adjustable contact 84 may be so adjusted that no current flows through the field winding 78 when the voltage of the arc in the welding circuit 10 is of the predetermined value. Accordingly, when the voltage of the arc is of the predetermined value, the output of the control generator 76 is substantially zero, and the indicating lamp 75 remains dark.

Should the voltage of the arc increase, it predominates over the control voltage, so that a circulating current flows from the conductor 18, through conductor 86, potentiometer 82, contact 84, the field winding 78 and conductors 87, back to conductor 16. The output of the generator 76 increases and the indicating lamp 75 lights, thus indicating to the operator that the voltage of the arc is not of the predetermined value. If the voltage of the arc decreases to a value below the predetermined value, a circulating current flows through the field winding 78 in the opposite direction, again affecting the energization of the indicating lamp 75 so as to indicate to the operator that the voltage of the arc is not of the proper value, thus enabling him to correct the condition.

Figure 3:
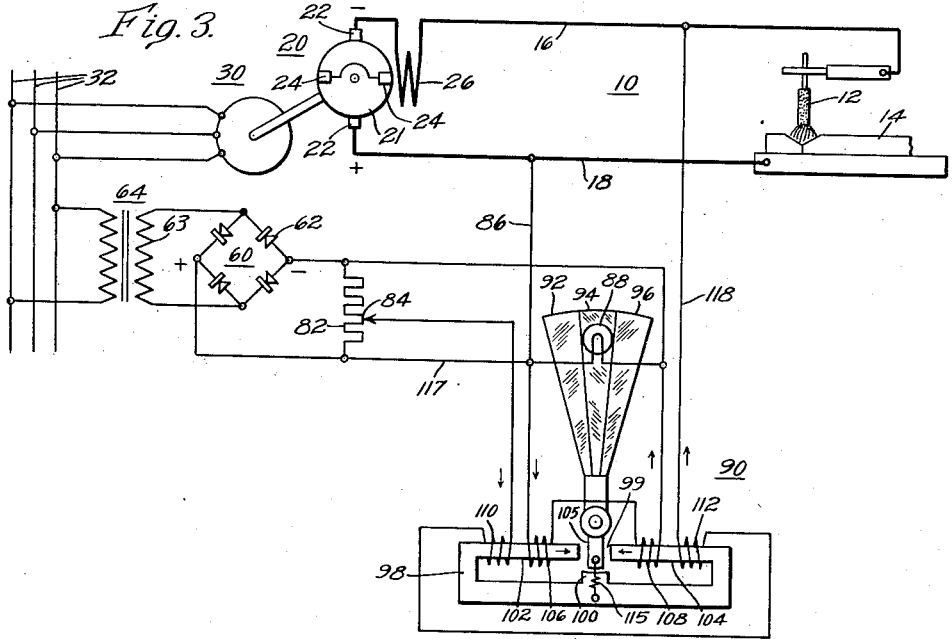
Fig. 3 is a diagrammatic view of a further modification of the invention.

In Fig. 3 the reference numeral 10 denotes, as hereinbefore, a welding circuit which may be conected to a suitable source such as the generator 20. In this modification of the invention, a single indicating lamp 88 may be connected to the terminals of a rectifier bridge circuit 60 so as to be continuously energized. In order to indicate to the welding operator variations in the voltage of the welding arc, suitable means may be provided for changing the signal produced by the lamp 88, such as, for example, the electromagnetic control relay 90, which may be positioned in association with the lamp 88. The relay 90 may be operatively connected for actuating a plurality of different colored lenses 92, 94 and 96 in front of the indicating lamp, depending on whether the voltage of the arc is greater than, equal to, or less than the predetermined value.

The relay 90 may, for example, comprise a substantially rectangular iron core 98 having an air gap 99 in one side thereof with a projecting pole 100 positioned opposite the air gap 99 between the arms 102 and 104 formed thereby. A movable magnetic armature 105 may be pivotally positioned in the air gap 99 with the free end adjacent the pole 100, and operatively connected to the lenses 92, 94 and 96 so as to actuate them with respect to the indicating lamp 88. The core 98 of the relay 90 may be provided with control windings 106 and 108 positioned on the arms 102 and 104 of the core and connected to a source of substantially constant control voltage such as the rectifier bridge 60, so as to produce magnetic fluxes in the arms 102 and 104 in opposite directions. Operating windings 110 and 112 may be positioned on the arms 102 and 104 of the core 98. Suitable means may be provided for normally biasing the armature 105 to a neutral position between the arms 102 and 104 of the core 98, such as, for example, the spring 115.

By connecting the operating windings 110 and 112 in series circuit relation so that they produce magnetic fluxes in the core 98 in the same direction, the armature 105 of the relay may be actuated in response to the direction of current flow through the operating windings, so that the relay is polarity responsive. By connecting the operating windings 110 and 112 in bridged circuit relation across the welding circuit and the control potentiometer 82, which may be connected in opposed relation, and adjusting the contact 84 to balance the control voltage from the control potentiometer 82 against the predetermined normal arc voltage, the armature 105 of the relay may be normally maintained in the neutral position, and may be actuated in accordance with variations of the arc voltage from the predetermined normal value to move the colored lenses 92 and 96 in front of the indicating lamp 88 to indicate to the operator any change in the voltage of the arc from the predetermined normal value.

When the voltage of the arc is of the predetermined normal value, the arc voltage balances the opposing voltage of the control potentiometer 82 and no current flows through the operating windings 110 and 112.

If the voltage of the arc increases, it predominates over the voltage of the control potentiometer 82 and a circulating current flows through the operating windings 110 and 112, from the conductor 18 through conductor 86, conductor 117, potentiometer 82, contact 84, operating windings 110 and 112, and conductor 118, back to conductor 16. Under these conditions, the fluxes produced by the operating winding 110 and the control winding 106 are additive, so that the pull exerted by them on the armature 105 overcomes the pull exerted by the fluxes produced by the operating winding 112 and the control winding 108, which are, under these conditions, differential or opposed. The armature 105 is thus actuated in a clockwise direction so that the lens 92 is moved in front of the indicating lamp 88, indicating to the operator that the voltage of the arc is greater than the predetermined normal value.

If the voltage of the arc decreases to a value less than the predetermined normal value, the voltage applied to the operating windings 110 and 112 from the control potentiometer 82 predominates, so that a circulating current flows through the operating windings 110 and 112 in the reverse direction. Under these conditions, the magnetic fluxes produced by the operating winding 110 and the control winding 106 are opposed, while those produced by the operating winding 112 and the control winding 108 are additive. The armature 105 is, therefore, actuated in a counter-clockwise direction, so that the lens 96 is moved in front of the indicating lamp 88 to indicate to the operator that the voltage of the arc is less than the predetermined normal value.

When the voltage of the arc is of the predetermined normal value, the voltage of the arc balances the voltage of the control potentiometer 82, and no current flows on the operating windings 110 and 112. The magnetic fluxes produced by the control windings 106 and 108 being equal and opposite, the spring 115 biases the armature 105 to a neutral position in the air gap 99 between the arms 102 and 104 of the core 98. The lens 94 is, therefore, positioned in front of the indicating lamp 88, indicating to the operator that the voltage of the arc is of the predetermined normal value.

Figure 4:
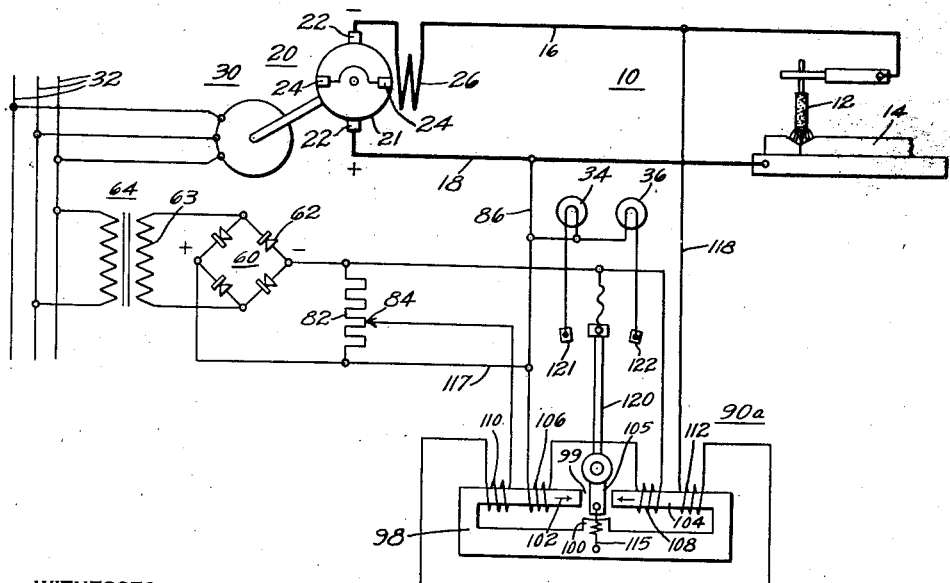
Figs. 4 and 5 illustrate the application of still other forms of the invention.

The modification of the invention shown in Fig. 4 is generally the same as the system of Fig. 3, except that the control relay 90a is provided with contact members for controlling a pair of indicating lamps, instead of utilizing its movable armature to actuate the color lenses and vary the signal of a single lamp.

In this instance the control relay 90a is provided with a movable contact member 120 actuated by the armature 105 so as to engage either of the stationary contact members 121 or 122 to complete energizing circuits for the indicating lamps 34 and 36, respectively. When the arc is of the predetermined voltage, the armature 105 is biased to an intermediate position by the spring 115, so that both of the indicating lamps 34 and 36 are deenergized. When the voltage of the arc increases above the predetermined normal value, the armature 105 is actuated in a clockwise direction so as to complete an energizing circuit through the stationary contact member 122 for the indicating lamp 36. When the voltage of the arc decreases to a value less than the predetermined normal value, the armature 105 is accordingly actuated in a counter-clockwise direction so as to complete an energizing circuit for the indicating lamp 34 through the stationary contact member 121.

Figure 5:
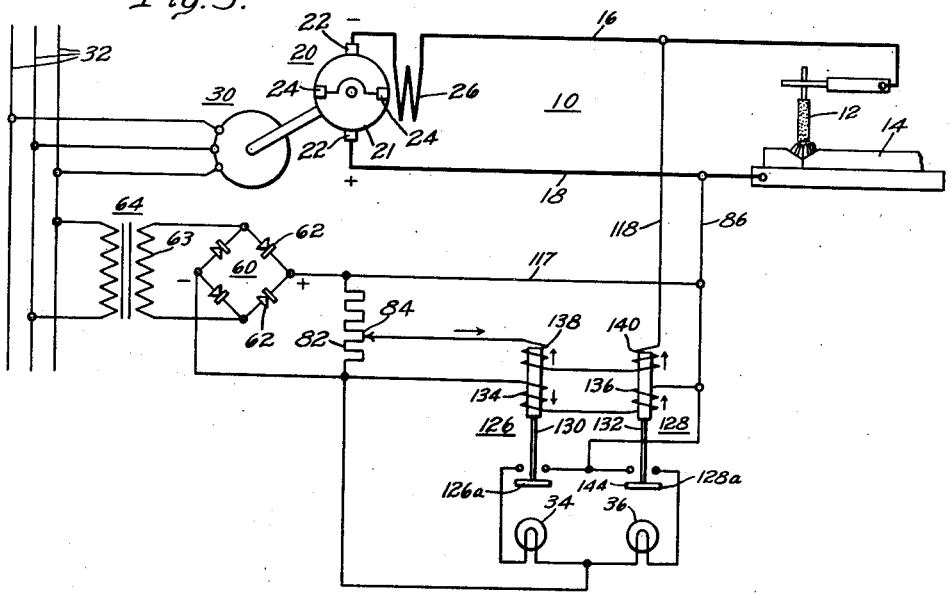

In the system illustrated in Fig. 5, the energization of the indicating lamps 34 and 36 may be separately controlled by means of polarity responsive control relays 126 and 128, having armatures 130 and 132, polarizing control windings 134 and 136, and operating windings 138 and 140, respectively. In this instance the polarizing windings 134 and 136 may be connected to the source of control potential 60, and the operating windings 138 and 140 may be connected in series circuit and in bridged circuit relation with the welding circuit 10 and the control potentiometer 82, which may be connected in opposed relation by the conductor 86. The polarizing windings may themselves be ineffective to operate the relays, and the operating windings may be so connected that when the arc voltage is less than the predetermined value the windings of the relay 126 are cumulative, and when it is greater than the predetermined value, those of the relay 128 are cumulative. By so connecting the operating windings 138 and 140, the relays 126 and 128 may be utilized to control the energization of the lamps 34 and 36 in accordance with the condition of the arc voltage.

When the voltage of the arc is greater than the predetermined normal value, it predominates, and current flows in the operating windings 138 and 140 from the conductor 18 through conductor 86, conductor 117, control potentiometer 82, contact 84, operating windings 138 and 140, and conductor 118 back to conductor 16. The magnetic fluxes produced by the operating winding 140 and the polarizing winding 136 are additive, while the fluxes produced by the operating winding 138 and the polarizing winding 134 are differential. Under these conditions, the control relay 128 operates to close its contact members 128a completing an energizing circuit for the indicating lamp 36 to indicate that the arc voltage is high.

When the voltage of the arc is less than the predetermined normal value, the circulating current in the operating windings 138 and 140 flows in the reverse direction, so that the fluxes produced by the operating winding 138 and the control winding 134 are additive. The control relay 126, therefore, operates to close contact members 126a and complete an energizing circuit for the indicating lamp 34 to indicate that the arc voltage is low.

When the voltage of the arc is of the predetermined normal value, it balances with the voltage of the control potentiometer 82, and substantially no current flows in the operating windings 134 and 136, so that neither of the control relays 122 and 124 operate, and both of the indicating lamps remain dark, indicating that the voltage of the arc is of the predetermined value.

Figure 6:
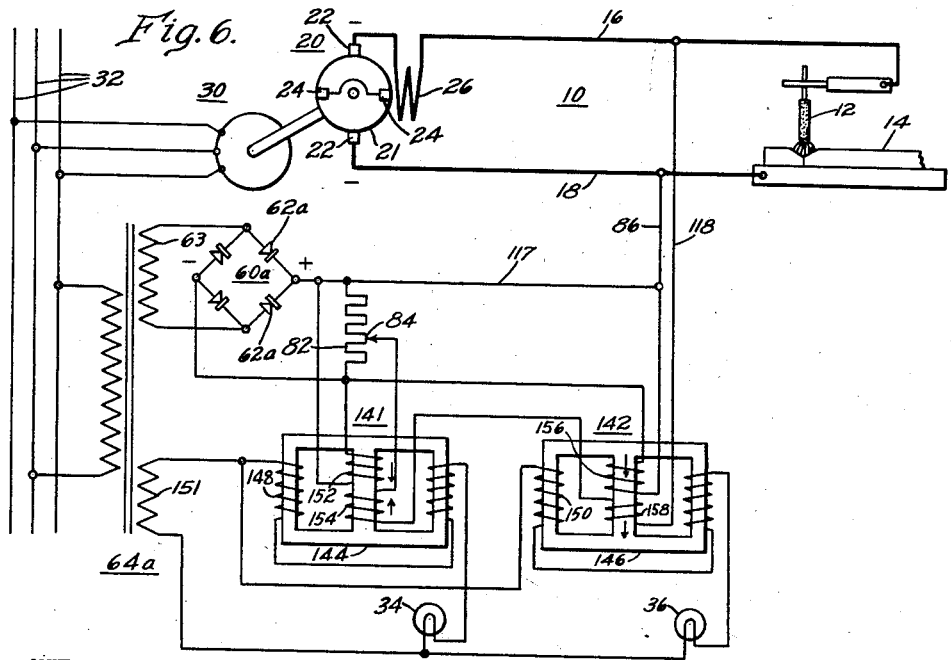

Referring to the modification of the invention shown in Fig. 6, the system is generally the same as those hereinbefore described, except that in this instance the energization of the indicating lamps 34 and 36 is controlled by means of the saturable reactors 141 and 142, respectively. The reactors 141 and 142 may, for example, comprise suitable magnetic cores 144 and 146 of the three-legged type having alternating current windings 148 and 150 on the outer legs thereof, connected in series circuit relation with the indicating lamps 34 and 36, respectively, and a source of alternating current such as, for example, a tertiary winding 151 of a control transformer 64a. The reactors 141 and 142 may also be provided with a plurality of direct current control windings 152, 154 and 156, 158, for controlling the impedance of the reactors.

The control windings 152 and 156 may, for example, be connected to the rectifier bridge circuit source of control voltage 60a, while the control windings 154 and 158 may be connected in series circuit and in bridged relation across the welding circuit 10 and the control potentiometer 82. By properly adjusting the contact 84, the voltage of the arc may be made to balance the voltage of the control potentiometer 82 when the arc is of the proper length. The control windings may be so related that the impedance of the reactors 141 and 142 may be controlled by the control windings so as to control the energization of the indicating lamps 34 and 36 to indicate to the operator the relative value of the arc voltage with respect to the predetermined normal value.

When the voltage of the arc is of the predetermined normal value, no current flows in the control windings 154 and 158, so that the cores 144 and 146 are not saturated. The indicating lamps 34 and 36, therefore, remain dark.

When the voltage of the arc increases above the predetermined normal value, it predominates over the voltage of the control potentiometer 82, so that a circulating current flows in the control windings 154 and 158 of the reactors from the conductor 18 through the conductor 86, conductor 117, potentiometer 82, contact 84, control windings 154 and 158, and conductor 118 to conductor 16. The fluxes produced by the control windings 156 and 158 under these conditions are additive, while those produced by the control windings 152 and 154 are opposed. Accordingly, the core 146 saturates so that the impedance of the reactor 142 is reduced, the lamp 36 lights, indicating to the operator that the voltage of the arc is too high.

When the voltage of the arc becomes less than the predetermined normal value, the direction of current flow in the control windings 154 and 158 reverses. The fluxes produced by the control windings 152 and 154 are then additive while those produced by the control windings 156 and 158 are opposed. The core 144 of the reactor 141 saturates and the lamp 34 lights, while the lamp 36 is extinguished, indicating that the arc voltage is too low.

The control system illustrated in Fig. 7 utilizes a single saturable reactor 160 for controlling a single indicating lamp 88 to indicate variations in the arc voltage from the predetermined value.

The reactor 160 may comprise a three-legged core 162, provided with alternating-current windings 164 on the outer legs thereof, which are connected in series circuit relation with the indicating lamp 88 and a suitable source of alternating current, such as the tertiary winding 151 of a control transformer 64a. In order to control the impedance of the reactor 160, direct-current windings 168 and 170 may be positioned on the central leg of the core 162 and connected to the source of control potential 60a and the welding circuit 10, respectively, in opposed relation. An adjustable control resistor 171 may be connected in series circuit relation with the winding 168 for adjusting the impedance of the reactor.

When the arc voltage is of a predetermined normal value, the control resistor 171 may be adjusted so that the voltage applied to the control winding 170 by the welding circuit produces in the core 162 a magnetic flux equal and opposite to the flux produced by the control winding 168. Accordingly, the impedance of the reactor 160 is not affected thereby, and the indicating lamp 88 remains dark. If the voltage of the arc increases or decreases from the predetermined normal value, the magnetic flux produced by the control winding 170 varies accordingly, and a resultant magnetic flux is produced in the core 162, thus reducing the impedance of the reactor 160 and causing the indicating lamp 88 to light, indicating to the operator a departure from the predetermined value of arc voltage.

In the modification of the invention illustrated in Fig. 8, the system is generally the same as those hereinbefore described, except that in this instance the energization of the indicating lamps 34 and 36 may be controlled by means of the saturable reactors 172 and 174, respectively, to indicate whether the arc voltage is less than, equal to, or greater than the predetermined normal value.

The reactors may comprise three-legged cores 176 and 178, with alternating current windings 180 and 182 on the outer legs thereof, which may be connected in series circuit relation with a suitable source of alternating current, such as the tertiary winding 151 of a suitable control transformer 64a and the indicating lamps 34 and 36, respectively. The reactor 172 may be provided with direct-current control windings 184 and 186, while the reactor 174 may be provided with a single direct-current control winding 188. The control windings 186 and 188 in this instance are connected in series circuit relation with a suitable control resistor 189 across the welding circuit 10, while the control winding 184 may be so connected to the source of direct-current control potential 60a as to be differential with respect to the winding 186.

By suitably designing the control winding 188 and proportioning the size of the core 178 of the reactor 174, the core may be made to saturate when the voltage of the arc increases above a predetermined normal value, so that the indicating lamp 36 is energized and lights to indicate to the operator this deviation from the predetermined value.

By properly proportioning the size of the core 176 of the reactor 172, saturation thereof may be prevented for any increase in the arc voltage over the predetermined value within any reasonable range of welding values, so long as the control winding 184 is energized, since the windings 184 and 186 are opposed. The core 176 may thus be made to saturate substantially only when the voltage of the arc is reduced below the predetermined normal value, so that the lamp 34 is energized, and lights to indicate the deviation from the predetermined normal arc voltage.

From the above description and the accompanying drawings, it will be apparent that I have provided in a simple and effective manner for indicating to a welding operator, deviations in the length or voltage of the welding arc from a predetermined normal value. The indicating systems of my invention are of a simple construction and economical to manufacture. The entire indicating system may readily be made in sufficiently compact and light weight form that it may be easily moved from one location to another without imposing any undue burden on the operator. Since only relatively simple mechanical control devices, or control devices having no moving parts of any description are used, indicating systems embodying my invention are extremely durable and are relatively unaffected by the shocks commonly incident to devices which are moved from one location to another in connection with welding operations.

Since certain changes may be made in the above described constructions, and different embodiments of the invention may be made without departing from the spirit or scope of the invention, it is intended that all the matter contained in the above description or shown in the accompanying drawings shall be considered as illustrative, and not in a limiting sense.

I claim as my invention:

1. An indicating system for a load circuit comprising a plurality of indicating lamps connected to a source of alternating current, a normally unsaturated saturable reactor for controlling the energization of each indicating lamp having an alternating current winding connected in series circuit relation therewith for reducing the energization of its associated lamp, and a plurality of direct current windings, circuit means connected for applying to one of the direct current windings on each of the reactors a substantially constant control voltage insufficient to effect saturation thereof, and additional circuit means connected for applying to the other of said direct current windings in opposite senses the differential between said control voltage and an arc responsive voltage to selectively, differentially or cumulatively energize the said other winding with respect to the said one winding, depending on the relative values of the arc responsive and the control voltages and change the impedances of the reactors in opposite senses for changes of load circuit voltage in the same sense at different values of load circuit voltage.

2. The combination in a voltage indicator for a load circuit in which an electric arc is maintained, of an indicator device, a source of substantially constant direct current voltage of a predetermined value, and control means for controlling the energization of the indicator device including normally unsaturated saturable reactor means having one winding connected between the indicator device and an alternating current source and a plurality of direct current windings so connected to the load circuit and to the source of direct current control voltage in opposed relation that saturation of the reactor means is effected at different values of voltage above and below a predetermined normal value whereby the indicator device indicates departures in either direction from a predetermined zone of voltages.

3. The combination in an indicating system for an arc welding system, of a plurality of indicating means adapted to be energized from an alternating current source, means for producing a substantially constant direct current control voltage, circuit means for producing a variable direct current control voltage proportional to the voltage of the welding system, a normally unsaturated reactor having a winding on a saturable core connected in series circuit relation with one of the indicating means for reducing the energization thereof and a pair of direct current windings connected to be differentially energized by the direct current voltages effective to saturate the core when the voltage of the welding system becomes lower than a predetermined minimum value and increase the energization of said one indicating means, and an additional normally unsaturated reactor having a winding on a saturable core connected in series circuit relation with the other indicating means for reducing the energization thereof and a direct current winding so connected to the welding system as to saturate the core when the voltage of the welding system becomes higher than a predetermined maximum value and increase the energization of said other indicating means.

4. In an indicating system for a variable voltage load circuit, a pair of indicating lamps connected to an alternating current source, a pair of normally unsaturated saturable reactor means including a plurality of direct current control windings and a plurality of alternating current impedance windings connected to reduce the energization of the indicating means, circuit means producing a substantially constant direct current control voltage, additional circuit means producing a direct current control voltage proportional to the voltage of the load circuit, and control circuit means connecting one direct current control winding on each of the saturable reactor means to the circuit means and additional circuit means in opposition for effecting saturation of one of the saturable reactor means and increasing the energization of one of the indicating means when the voltage of the load circuit rises above a predetermined value, and additional control circuit means connecting another of the direct current control windings on the other saturable reactor means to the circuit means for cumulative energization relative to said one direct current winding so as to effect saturation of the other saturable reactor means and increase the energization of the other indicating means when the voltage of the load circuit falls below the predetermined value.

5. The combination in a voltage indicating system for a variable voltage load circuit, of a pair of indicating lamps energized from an alternating current source, a saturable reactor controlling the energization of each indicating lamp having an impedance winding connected in series circuit relation with the lamp for normally reducing its energization below the value required to light the lamp and at least one direct current control winding, means producing a substantially constant unidirectional control voltage, additional means producing a voltage proportional to the voltage of the load circuit, and circuit means so connecting one of the direct current control windings on each reactor to the two voltage producing means in opposed relation and another of the direct current windings on at least one of the reactors to the substantially constant voltage producing means as to cause one of the lamps to light when the voltage of the load circuit rises above a predetermined value and the other when the voltage falls below the predetermined value.

JOHN H. BLANKENBUEHLER.